(12) United States Patent
Hu et al.

(10) Patent No.: US 12,142,752 B2
(45) Date of Patent: Nov. 12, 2024

(54) PREPARATION METHOD FOR LITHIUM-SULFUR BATTERY BASED ON LARGE-AREA THICK-FILM CONTROLLABLE TEXTURED PHOTONIC CRYSTAL

(71) Applicant: Shanghai Jiaotong University, Shanghai (CN)

(72) Inventors: Xiaobin Hu, Shanghai (CN); Shengxuan Lin, Shanghai (CN); Zihe Cai, Shanghai (CN); Jlajia Xiao, Shanghai (CN); Yuhang Chen, Shanghai (CN); Yifan Wang, Shanghai (CN)

(73) Assignee: SHANGHAI JIAOTONG UNIVERSITY, Shanghai (CN)

( * ) Notice: Subject to any disclaimer, the term of this patent is extended or adjusted under 35 U.S.C. 154(b) by 468 days.

(21) Appl. No.: 17/761,698

(22) PCT Filed: Dec. 13, 2019

(86) PCT No.: PCT/CN2019/124964
§ 371 (c)(1),
(2) Date: Mar. 18, 2022

(87) PCT Pub. No.: WO2021/114196
PCT Pub. Date: Jun. 17, 2021

(65) Prior Publication Data
US 2022/0336789 A1    Oct. 20, 2022

(30) Foreign Application Priority Data

Dec. 9, 2019   (CN) .......................... 201911250675.0

(51) Int. Cl.
*H01M 4/1395*   (2010.01)
*H01M 10/0525*  (2010.01)
*H01M 10/058*   (2010.01)

(52) U.S. Cl.
CPC ..... *H01M 4/1395* (2013.01); *H01M 10/0525* (2013.01); *H01M 10/058* (2013.01); *Y10T 29/49108* (2015.01)

(58) Field of Classification Search
CPC ............... H01M 4/139; H01M 4/1395; H01M 4/0416; H01M 4/134; H01M 4/382; H01M 4/04; Y10T 29/49108
(Continued)

(56) References Cited

U.S. PATENT DOCUMENTS

| | | | | |
|---|---|---|---|---|
| 6,030,720 A | * | 2/2000 | Chu | ............... H01M 10/36 429/105 |
| 2002/0045102 A1 | * | 4/2002 | Jung | ............... H01M 4/5815 429/105 |
| 2003/0106487 A1 | | 6/2003 | Chiang | |

FOREIGN PATENT DOCUMENTS

| | | |
|---|---|---|
| CN | 100410301 C | 8/2008 |
| CN | 102691106 A | 9/2012 |

(Continued)

OTHER PUBLICATIONS

International Search Report (with English Abstract) and Written Opinion issued in PCT/CN2019/124964, dated Jul. 28, 2020, 9 pages provided.

*Primary Examiner* — Thiem D Phan
(74) *Attorney, Agent, or Firm* — HSML P. C.

(57) ABSTRACT

Monodisperse microspheres are arranged in macropores of a substrate to form a photonic crystal structure; with the photonic crystal as a template, ordered microporous carbon is synthesized in gaps of the template, and then the photonic crystal template is removed to obtain a three-dimensional (Continued)

ordered hierarchical porous carbon photonic crystal, and thus a large-area thick-film controllable textured photonic crystal is formed and is composited with element sulphur to obtain a sulphur cathode, and the sulphur cathode and metal lithium serving as a counter electrode are assembled into a lithium-sulphur battery. According to the invention, the controllable thick film with an electrode thickness of 10 μm to 650 μm can be achieved by changing the thickness of the substrate and the concentration of a suspension liquid. In the meanwhile, large-area preparation with an electrode area of 0.1 cm$^2$ to 400 cm$^2$ can be achieved by changing the area of the substrate.

10 Claims, 2 Drawing Sheets

(58) Field of Classification Search
USPC .............................. 29/623.1, 623.5, 840, 843
See application file for complete search history.

(56) References Cited

FOREIGN PATENT DOCUMENTS

| | | |
|---|---|---|
| CN | 108461706 A | 8/2018 |
| CN | 110316715 A | 10/2019 |
| CN | 110407192 A | 11/2019 |
| CN | 110518247 A | 11/2019 |

* cited by examiner

PREPARATION METHOD FOR LITHIUM-SULFUR BATTERY BASED ON LARGE-AREA THICK-FILM CONTROLLABLE TEXTURED PHOTONIC CRYSTAL

BACKGROUND OF THE INVENTION

1. Technical Field

The present invention relates to a material and a preparation method in the technical field of lithium batteries, in particular to a preparation method for a lithium-sulfur battery based on a large-area thick-film controllable textured photonic crystal.

2. Description of Related Art

With the increasing depletion of natural resources, traditional non-renewable energy can no longer meet the needs of human society development, people's demand for alternative energy is increasingly urgent. Lithium-ion batteries, as the current commonly used electrochemical storage devices, have the characteristics of good thermal safety, good reversibility, non-toxicity and more. However, given that the lithium-ion battery is based on the reaction mechanism of repeated lithium ion intercalation and delithiation between two electrodes, its theoretical specific capacity and energy density are limited and cannot meet the needs of high-power equipment such as power vehicles.

Lithium-sulfur batteries are a type of energy storage device with wide application prospects in people's daily life. Different from lithium-ion batteries, the lithium-sulfur batteries have a reaction mechanis based on the chemical reaction of metal lithium and sulfur, so they have the characteristics of high theoretical specific capacity (1675 $mAhg^{-1}$), high theoretical energy density, sulfur abundance, environmental friendliness, and more. However, like other lithium batteries, the safety of lithium-sulfur batteries, such as spontaneous combustion, has always hindered the application prospects of power batteries. The root cause of the spontaneous combustion phenomenon is the local overheating of an electric battery stack, and the uneven microscopic reaction inside the battery electrodes is the main culprit of the local overheating. Using the three-dimensional ordered interconnected porous structure of photonic crystals as the carrier of an active material can effectively solve the problem of uneven microscopic reaction. However, since the traditional photonic crystal has small area and thickness, the surface density of active materials is limited and the high surface capacity density and surface energy density of lithium-sulfur batteries cannot be achieved.

In order to achieve this technical requirement, it is required to prepare large-area, crack-free, thick-film photonic crystals. The difficulty is that when the area and thickness increase, a large amount of stress will be generated on the surface during the drying process, making cracks unavoidable. At present, the preparation of opal-structured photonic crystals mainly adopts self-assembly method, spraying method, spin coating method and suction filtration method, but the above-mentioned prior art has the following defects:

1) The general self-assembly method, spraying method, and spin-coating method select a substrate with a smooth surface (such as glass, metal foil, etc.). Chinese patent CN102691106A discloses a method for preparing a crack-free photonic crystal, where the opal-structured photonic crystal is self-assembled on the surface of a flexible substrate by spraying, spin coating or inkjet printing. However, the thickness of the photonic crystal obtained by such methods is usually not more than 20 μm.

2) The spraying method is used to prepare a large-area photonic crystal. However, due to the fast drying process, the prepared photonic crystal has poor orderliness, and obvious cracks will occur due to surface tension after drying.

3) The suction filtration method can be used to prepare a photonic crystal with a thickness of up to 500 μm. Chinese patent CN100410301C discloses a method for preparing an ordered porous conductive polymer by suction filtration/impregnation method, where a 0.22 μm filter membrane is used as a substrate and the monodisperse microspheres are formed into colloidal crystals by vacuum filtration. Similar to the spraying method, there is the problem of cracking after drying, and the suction filtration method requires the pore size of the substrate to be smaller than the particle size of the microspheres, which limits its further application.

BRIEF SUMMARY OF THE INVENTION

The present invention is intended to provide a preparation method for a lithium-sulfur battery based on a large-area thick-film controllable textured photonic crystal in order to overcome the above-mentioned defects in the prior art, and solve the technical problems of small area and uncontrollable thickness in the prior art.

The objective of the present invention can be achieved through the following technical solutions.

A preparation method for a lithium-sulfur battery based on a large-area thick-film controllable textured photonic crystal, including:

preparation of monodisperse microsphere suspension liquid: adding a solvent to monodisperse microspheres and carrying out dispersion to obtain a suspension liquid;

pretreatment of a substrate: ultrasonically cleaning the substrate in ethanol, acetone and isopropanol to remove impurities and organics from the surface, and then drying the substrate;

preparation of a microsphere photonic crystal: placing the substrate in the prepared suspension liquid, and then moving to an oven for self-assembly at a certain temperature until the solvent in the suspension liquid is completely volatilized, thus obtaining the microsphere photonic crystal;

preparation of a carbon photonic crystal:

soaking in a precursor solution of a metal-organic framework substance the substrate on which the microsphere photonic crystal is grown, and then moving the substrate to the oven for temperature-controlled reaction so that the metal-organic framework substance is generated in the gaps of the microsphere photonic crystal;

moving the substrate to a tube furnace for high-temperature heat treatment in an inert atmosphere, and then naturally cooling the substrate to room temperature; and taking the substrate out and soaking the substrate in a hydrofluoric acid solution, and then taking the substrate out for cleaning and drying;

preparation of a sulfur cathode:

soaking the substrate in an organic solution of elemental sulfur so that the substrate fully absorbs the elemental sulfur and then taking the substrate out for drying; and sealing and treating the substrate at an appropriate temperature and then naturally cooling and dying the substrate to obtain the sulfur cathode; and preparation of a lithium-sulfur battery: assembling the sulfur cathode serving as a working electrode, a lithium sheet serving as a counter electrode, and a diaphragm made of polypropylene into the lithium-sulfur battery.

the monodisperse microspheres have a particle size of 100 nm to 1000 nm and the suspension liquid has a concentration of 0.1 wt % to 10 wt %.

The substrate is carbon fiber paper, carbon fiber cloth, wire mesh or nickel foam, and the wire mesh is a stainless steel mesh, a nickel mesh, a titanium mesh, a copper mesh, a tungsten mesh, a molybdenum mesh, a zirconium mesh, a lead mesh or a platinum mesh. The existing photonic crystals are all prepared on a smooth surface, which is quite different from the present invention. The substrate used in the present invention is of a grid-like structure or a non-smooth surface structure. Compared with the preparation of photonic crystals on smooth surfaces, the present invention has the following advantages. First, the present invention expands the selection range of the substrate for the traditional preparation of photonic crystals from smooth solid substrates to non-smooth grid-like substrates. Second, the present invention simplifies the treatment of the substrate. Traditional substrates such as glass require multiple pre-treatments such as acid treatment while the present invention only needs simple treatment with water and alcohol. Third, the preparation of photonic crystals on a smooth surface is limited in both area and thickness. The present invention can obtain photonic crystals of any area and thickness we want, providing more options for practical applications. Fourth, the present invention solves the problem of large-area cracks existing in photonic crystals traditionally prepared on a smooth substrate, and confines the uniform distribution of photonic crystals in the meshes of the substrate, so that the obtained photonic crystal has a high degree of flat self-assembly and no cracks, which improves the integrity and connectivity of an inverse opal structure obtained subsequently.

The self-assembly is carried out at a temperature of 35° C. to 65° C.

The microsphere photonic crystal has a thickness of 10 μm to 650 μm and an area of 0.1 cm2 to 400 cm2.

In the precursor solution of the metal-organic framework substance, a metal salt used is zinc nitrate, nickel nitrate, iron nitrate, cobalt nitrate or manganese nitrate, an organic ligand used is 2-methylimidazole, and a solvent used is one or more of methanol, N,N-dimethylformamide and N,N-dimethylacetamide, the metal salt has a solubility of 0.1 M to 10 M, and the organic ligand has a solubility of 0.1 M to 20 M.

The temperature-controlled reaction is carried out a temperature of 50° C. to 90° C. for 1 h to 12 h; the high-temperature heat treatment is carried out at a temperature of 600° C. to 1200° C. for 3 h to 12 h.

The hydrofluoric acid solution has a concentration of 0.5 wt % to 30 wt %.

In the organic solution of elemental sulfur, a solvent used is toluene or carbon disulfide, and the concentration of elemental sulfur is 1 wt % to 10 wt %.

The treatment at an appropriate temperature is carried out at a temperature of 120° C. to 160° C. for 1 h to 24 h.

According to the invention, the controllable thick film with an electrode thickness of 10 μm to 650 μm can be achieved by changing the thickness of the substrate and the concentration of the suspension liquid. In the meanwhile, large-area preparation with an electrode area of 0.1 to 400 cm2 can be achieved by changing the area of the substrate. In addition, a high sulfur load of 1 mg·cm$^{-2}$ to 15 mg·cm$^{-2}$ can be achieved by adjusting the concentration of the organic solution of sulfur, thereby achieving a high surface capacity density and a high surface energy density of the lithium-sulfur battery.

Compared with the prior art, the technical solution of the present invention has the advantages of simple process, low cost and wide application range, and the prepared battery electrode has the characteristics of large area, controllable thick film and high surface sulfur load.

DETAILED DESCRIPTION OF THE INVENTION

Figure 1:
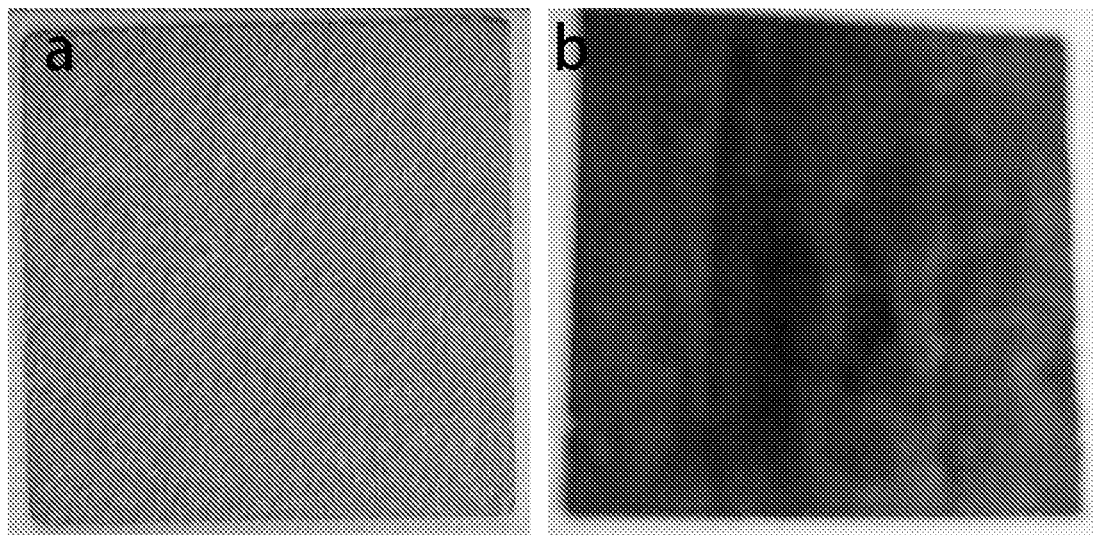
FIG. 1 shows a picture of a prepared photonic crystal according to Example 1 and a picture of a lithium-sulfur battery assembled therefrom.

The invention will be described in detail below with reference to specific embodiments. The following examples will help those skilled in the art to further understand the present invention, but do not limit the present invention in any form. It should be noted that those of ordinary skill in the art may further make variations and improvements without departing from the conception of the invention, and these all fall within the protection scope of the invention.

Disclosed is a preparation method for a lithium-sulfur battery based on a large-area thick-film controllable textured photonic crystal, including:

(1) Preparation of Monodisperse Microsphere Suspension Liquid (1.1) putting monodisperse microspheres with a particle size of 100 nm to 1000 nm in a beaker, adding a solvent, and ultrasonically dispersing the monodisperse microspheres to form a suspension liquid of a certain concentration, wherein the concentration of the suspension liquid is with a range of 0.1% to 10% according to different substrates;

(2) Pretreatment of a Substrate (2.1) ultrasonically cleaning the substrate in ethanol, acetone and isopropanol respectively to remove impurities and organics from the surface, and then drying the substrate in an oven for subsequent use, wherein the substrate that can be used is carbon fiber paper, carbon fiber cloth, wire mesh or nickel foam, and in a case of the wire mesh, a stainless steel mesh, a nickel mesh, a titanium mesh, a copper mesh, a tungsten mesh, a molybdenum mesh, a zirconium mesh, a lead mesh or a platinum mesh may be used;

(3) Preparation of a Microsphere Photonic Crystal (3.1) placing the substrate in the prepared suspension liquid, and then moving to the oven for self-assembly at a temperature of 35° C. to 65° C. until the solvent in the suspension liquid is completely volatilized, thus obtaining the microsphere photonic crystal with a thickness of 10 μm to 650 μm and an area of 0.1 cm$^2$ to 400 cm$^2$;

(4) Preparation of a Carbon Photonic Crystal (4.1) soaking in a precursor solution of a metal-organic framework substance the substrate on which the microsphere photonic crystal is grown, wherein in the precursor solution of the metal-organic framework substance, a metal salt used is zinc nitrate, nickel nitrate, iron nitrate, cobalt nitrate or manganese nitrate, an organic ligand used is 2-methylimidazole, and a solvent used is one or more of methanol, N,N-dimethylformamide and N,N-dimethylacetamide, the metal salt has a solubility of 0.1 M to 10 M, and the organic ligand has a solubility of 0.1 M to 20 M; and then moving the substrate to the oven for reaction at 50° C. to 90° C. for 1 h to 12 h so that the metal-organic framework substance is generated in the gaps of the microsphere photonic crystal;

(4.2) moving the substrate to a tube furnace for high-temperature heat treatment in an inert atmosphere at a temperature of 600° C. to 1200° C. for 3 h to 12 h, and then naturally cooling the substrate to room temperature; and (4.3) taking the substrate out and soaking the substrate in a 0.5 wt %-30 wt % hydrofluoric acid solution for a period of time, and then taking the substrate out for cleaning and drying;

(5) Preparation of a Sulfur Cathode (5.1) soaking the substrate in an organic solution of elemental sulfur so that the substrate fully absorbs the elemental sulfur and then taking the substrate out for drying, wherein in the organic solution of elemental sulfur, a solvent used is toluene or carbon disulfide, and the concentration of elemental sulfur is 1 wt % to 10 wt %; and (5.2) sealing the substrate in a small glass bottle, treating the substrate at an appropriate temperature of 120° C. to 160° C. in the tube furnace for 1 h to 24 h and then naturally cooling and dying the substrate;

(6) Preparation of a Lithium-Sulfur Battery (6.1) assembling the sulfur cathode serving as a working electrode, a lithium sheet serving as a counter electrode, and a diaphragm made of polypropylene into the lithium-sulfur battery.

The following are more detailed implementation examples, which further illustrate the technical solutions of the present invention and the technical effects that can be achieved.

EXAMPLE 1

Small glass bottles used for self-assembly of a silica opal template were ultrasonically cleaned at least 3 times with deionized water for 20 min. Carbon fiber paper was ultrasonically cleaned with deionized water, acetone, isopropanol and alcohol, 20 min each time, and then dried for later use. The glass bottle was full filled with an alcohol solution of silica microspheres with a concentration of 2% and a diameter of 200 nm added dropwise, and the cleaned carbon fiber paper was then put in the glass bottle obliquely. The glass bottle was placed in a blast drying oven with a constant temperature of 35° C. until the alcohol solution in the glass bottle was completely volatilized so that photonic crystals were self-assembled in the macropores of the carbon fiber paper. 0.84 g of zinc nitrate hexahydrate, 0.96 g of 2-methylimidazole, 25 mL of methanol and 25 mL of N,N-dimethylformamide were mixed and stirred for 10 min to obtain a precursor solution of a metal-organic framework substance. The carbon fiber paper from the previous step was soaked in the precursor solution of the metal-organic framework substance for 1 h, and then moved to a drying oven for reaction at 70° C. for 6 h to form a compound of silica and the metal-organic framework substance in the macropores of the carbon fiber paper. The carbon fiber paper was moved to a tube furnace for heat treatment at 800° C. in an inert atmosphere for 3 h. The carbon fiber paper was then taken out and soaked with 20 wt % hydrofluoric acid for 1 day to remove the silicon dioxide template, and then a large-area thick-film controllable textured photonic crystal was obtained. The textured photonic crystal was soaked with a toluene solution of sulfur with a concentration of 1 wt % for 20 min, the toluene solution was evaporated up with a heating stirrer, and then the textured photonic crystal was sealed with a glass bottle, and heat-treated at 155° C. for 12 h in an argon atmosphere. The textured photonic crystal was then soaked with a methanol solution for 30 s and then a sulfur cathode was obtained. The textured photonic crystal sulfur cathode serving as a working electrode and a lithium sheet serving as a counter electrode were then assembled into a lithium-sulfur battery.

FIG. 1 shows a picture of a photonic crystal prepared by using carbon fiber paper as a substrate according to this embodiment and a lithium-sulfur battery assembled therefrom, where a shows a carbon fiber paper based composite silica photonic crystal, and b shows a textured photonic crystal sulfur cathode composed of a carbon fiber paper based composite carbon photonic crystal and sulfur. The textured photonic crystal prepared in this example has an area of 16 cm$^2$, a thickness of 230 μm, and a surface sulfur load of 11 mg·cm$^{-2}$. By selecting carbon fiber paper substrates of different thicknesses and cutting different areas, textured photonic crystals with different thicknesses and areas can be obtained. Moreover, combined with adjusting the concentration of the organic solution of sulfur, sulfur cathodes with different sulfur loads can be obtained.

EXAMPLE 2

Small glass bottles used for self-assembly of a silica opal template were ultrasonically cleaned at least 3 times with deionized water for 20 min. A nickel mesh was ultrasonically cleaned with deionized water, acetone, isopropanol and alcohol, 20 min each time, and then dried for later use. The glass bottle was full filled with an alcohol solution of silica microspheres with a concentration of 5% and a diameter of 300 nm added dropwise, and the cleaned nickel mesh was then put in the glass bottle obliquely. The glass bottle was placed in a blast drying oven with a constant temperature of 35° C. until the alcohol solution in the glass bottle was completely volatilized so that photonic crystals were self-assembled in the macropores of the nickel mesh. 0.42 g of zinc nitrate hexahydrate, 0.48 g of 2-methylimidazole, 25 mL of methanol and 25 mL of N,N-dimethylformamide were mixed and stirred for 10 min to obtain a precursor solution of a metal-organic framework substance. The nickel mesh from the previous step was soaked in the precursor solution of the metal-organic framework substance for 1 h, and then moved to a drying oven for reaction at 90° C. for 6 h to form a compound of silica and the metal-organic framework substance in the macropores of the nickel mesh. The nickel mesh was moved to a tube furnace for heat treatment at 900° C. in an inert atmosphere for 3 h. The nickel mesh was then taken out and soaked with 1 wt % hydrofluoric acid for 3 days to remove the silicon dioxide template, and then a large-area thick-film controllable textured photonic crystal was obtained. The textured photonic crystal was soaked with a toluene solution of sulfur with a concentration of 2 wt % for 20 min, the toluene solution was evaporated up with a heating stirrer, and then the textured photonic crystal was sealed with a glass bottle, and heat-treated at 155° C. for 12 h in an argon atmosphere. The textured photonic crystal was then soaked with a methanol solution for 30 s and then a sulfur cathode was obtained. The textured photonic crystal sulfur cathode serving as a working electrode and a lithium sheet serving as a counter electrode were then assembled into a lithium-sulfur battery.

Figure 2:
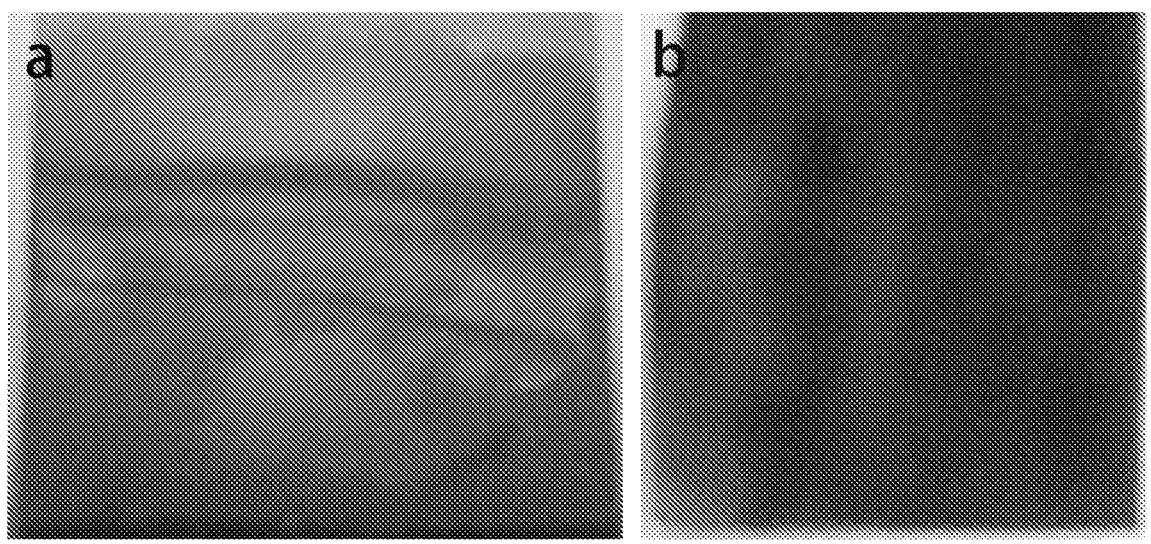
FIG. 2 shows a picture of a prepared photonic crystal according to Example 1 and a picture of a lithium-sulfur battery assembled therefrom.

FIG. 2 shows a picture of a photonic crystal prepared by using a nickel mesh as a substrate according to this embodiment and a lithium-sulfur battery assembled therefrom, where a shows a nickel mesh based composite silica photonic crystal, and b shows a textured photonic crystal sulfur cathode composed of a nickel mesh based composite carbon photonic crystal and sulfur. The textured photonic crystal prepared in this example has an area of 16 cm$^2$, a thickness of 180 μm, and a surface sulfur load of 8 mg·cm$^{-2}$. By selecting nickel mesh substrates of different thicknesses and cutting different areas, textured photonic crystals with different thicknesses and areas can be obtained. Moreover, combined with adjusting the concentration of the organic solution of sulfur, sulfur cathodes with different sulfur loads can be obtained.

EXAMPLE 3

Small glass bottles used for self-assembly of a silica opal template were ultrasonically cleaned at least 3 times with deionized water for 20 min. A tungsten mesh was ultrasonically cleaned with deionized water, acetone, isopropanol and alcohol, 20 min each time, and then dried for later use. The glass bottle was full filled with an alcohol solution of silica microspheres with a concentration of 8% and a diameter of 250 nm added dropwise, and the cleaned tungsten mesh was then put in the glass bottle obliquely. The glass bottle was placed in a blast drying oven with a constant temperature of 35° C. until the alcohol solution in the glass bottle was completely volatilized so that photonic crystals were self-assembled in the macropores of the tungsten mesh. 0.168 g of zinc nitrate hexahydrate, 0.192 g of 2-methylimidazole, 25 mL of methanol and 25 mL of N,N-dimethylformamide were mixed and stirred for 10 min to obtain a precursor solution of a metal-organic framework substance. The tungsten mesh from the previous step was soaked in the precursor solution of the metal-organic framework substance for 1 h, and then moved to a drying oven for reaction at 80° C. for 6 h to form a compound of silica and the metal-organic framework substance in the macropores of the tungsten mesh. The tungsten mesh was moved to a tube furnace for heat treatment at 900° C. in an inert atmosphere for 3 h. The nickel mesh was then taken out and soaked with 1 wt % hydrofluoric acid for 3 days to remove the silicon dioxide template, and then a large-area thick-film controllable textured photonic crystal was obtained. The textured photonic crystal was soaked with a carbon disulfide solution of sulfur with a concentration of 5 wt % for 10 min, the carbon disulfide solution was evaporated up with a heating stirrer, and then the textured photonic crystal was sealed with a glass bottle, and heat-treated at 155° C. for 12 h in an argon atmosphere. The textured photonic crystal was then soaked with a methanol solution for 30 s and then a sulfur cathode was obtained. The textured photonic crystal sulfur cathode serving as a working electrode and a lithium sheet serving as a counter electrode were then assembled into a lithium-sulfur battery.

Figure 3:
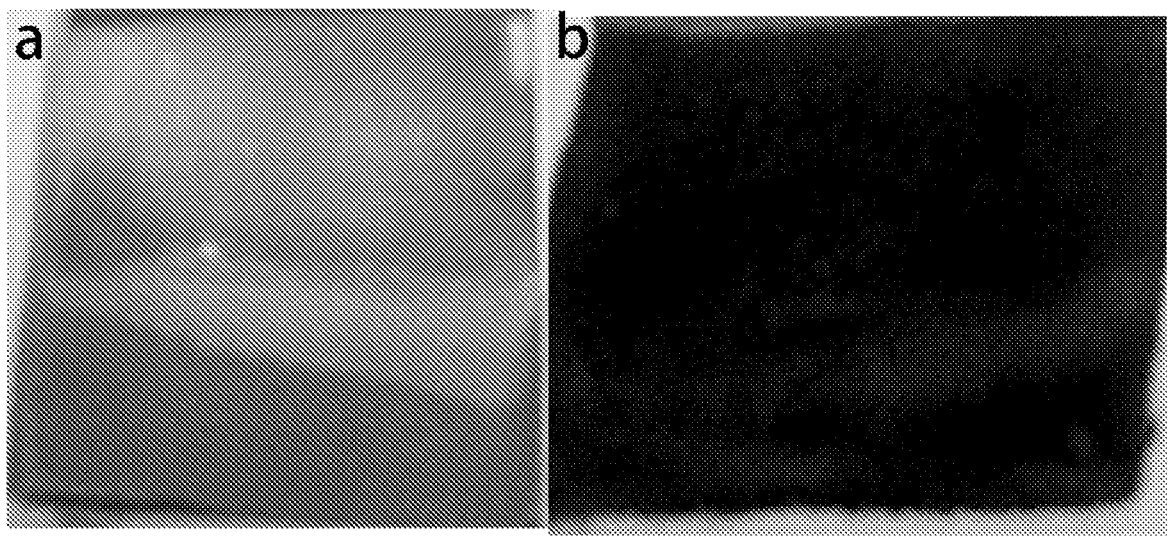
FIG. 3 shows a picture of a prepared photonic crystal according to Example 1 and a picture of a lithium-sulfur battery assembled therefrom.

FIG. 3 shows a picture of a photonic crystal prepared by using a tungsten mesh as a substrate according to this embodiment and a lithium-sulfur battery assembled therefrom, where a shows a tungsten mesh based composite silica photonic crystal, and b shows a textured photonic crystal sulfur cathode composed of a tungsten mesh based composite carbon photonic crystal and sulfur. The textured photonic crystal prepared in this example has an area of 16 cm$^2$, a thickness of 120 μm, and a surface sulfur load of 5 mg·cm$^{-2}$. By selecting tungsten mesh substrates of different thicknesses and cutting different areas, textured photonic crystals with different thicknesses and areas can be obtained. Moreover, combined with adjusting the concentration of the organic solution of sulfur, sulfur cathodes with different sulfur loads can be obtained.

EXAMPLE 4

Small glass bottles used for self-assembly of a silica opal template were ultrasonically cleaned at least 3 times with deionized water for 20 min. Carbon fiber cloth was ultrasonically cleaned with deionized water, acetone, isopropanol and alcohol, 20 min each time, and then dried for later use. The glass bottle was full filled with an alcohol solution of silica microspheres with a concentration of 8% and a diameter of 100 nm added dropwise, and the cleaned carbon fiber cloth was then put in the glass bottle obliquely. The glass bottle was placed in a blast drying oven with a constant temperature of 40° C. until the alcohol solution in the glass bottle was completely volatilized so that photonic crystals were self-assembled in the macropores of the carbon fiber cloth. Nickel nitrate with a solubility of 0.1M, 2-methylimidazole with a solubility of 5M and methanol were mixed and stirred for 10 min to obtain a precursor solution of a metal-organic framework substance. The carbon fiber cloth from the previous step was soaked in the precursor solution of the metal-organic framework substance for 1 h, and then moved to a drying oven for reaction at 50° C. for 12 h to form a compound of silica and the metal-organic framework substance in the macropores of the carbon fiber cloth. The carbon fiber cloth was moved to a tube furnace for heat treatment at 600° C. in an inert atmosphere for 12 h. The carbon fiber cloth was then taken out and soaked with 0.5 wt % hydrofluoric acid for 3 days to remove the silicon dioxide template, and then a large-area thick-film controllable textured photonic crystal was obtained. The textured photonic crystal was soaked with a toluene solution of sulfur with a concentration of 1 wt % for 10 min, the toluene solution was evaporated up with a heating stirrer, and then the textured photonic crystal was sealed with a glass bottle, and heat-treated at 120° C. for 24 h in an argon atmosphere. The textured photonic crystal was then soaked with a methanol solution for 30 s and then a sulfur cathode was obtained. The textured photonic crystal sulfur cathode serving as a working electrode and a lithium sheet serving as a counter electrode were then assembled into a lithium-sulfur battery.

EXAMPLE 5

Small glass bottles used for self-assembly of a silica opal template were ultrasonically cleaned at least 3 times with deionized water for 20 min. A zirconium mesh was ultrasonically cleaned with deionized water, acetone, isopropanol and alcohol, 20 min each time, and then dried for later use. The glass bottle was full filled with an alcohol solution of silica microspheres with a concentration of 0.1% and a diameter of 500 nm added dropwise, and the cleaned zirconium mesh was then put in the glass bottle obliquely. The glass bottle was placed in a blast drying oven with a constant temperature of 35° C. until the alcohol solution in the glass bottle was completely volatilized so that photonic crystals were self-assembled in the macropores of the zirconium mesh. Ferric nitrate with a solubility of 10M, 2-methylimidazole with a solubility of 0.1M and N,N-dimethylacetamide were mixed and stirred for 10 min to obtain a precursor solution of a metal-organic framework substance. The zirconium mesh from the previous step was soaked in the precursor solution of the metal-organic framework substance for 1 h, and then moved to a drying oven for reaction at 50° C. for 12 h to form a compound of silica and the metal-organic framework substance in the macropores of the zirconium mesh. The zirconium mesh was moved to a tube furnace for heat treatment at 1000° C. in an inert atmosphere for 4 h. The zirconium mesh was then taken out and soaked with 15 wt % hydrofluoric acid for 2 days to remove the silicon dioxide template, and then a large-area thick-film controllable textured photonic crystal was obtained. The textured photonic crystal was soaked with a toluene solution of sulfur with a concentration of 5 wt % for 10 min, the toluene solution was evaporated up with a heating stirrer, and then the textured photonic crystal was sealed with a glass bottle, and heat-treated at 160° C. for 1 h in an argon atmosphere. The textured photonic crystal was then soaked with a methanol solution for 30 s and then a sulfur cathode was obtained. The textured photonic crystal sulfur cathode serving as a working electrode and a lithium sheet serving as a counter electrode were then assembled into a lithium-sulfur battery.

EXAMPLE 6

Small glass bottles used for self-assembly of a silica opal template were ultrasonically cleaned at least 2 times with deionized water for 10 min. A platinum mesh was ultrasonically cleaned with deionized water, acetone, isopropanol and alcohol, 10 min each time, and then dried for later use. The glass bottle was full filled with an alcohol solution of silica microspheres with a concentration of 10% and a diameter of 1000 nm added dropwise, and the cleaned platinum mesh was then put in the glass bottle obliquely. The glass bottle was placed in a blast drying oven with a constant temperature of 65° C. until the alcohol solution in the glass bottle was completely volatilized so that photonic crystals were self-assembled in the macropores of the platinum mesh. Manganese nitrate with a solubility of 10M, 2-methylimidazole with a solubility of 0.1M and N,N-dimethylacetamide were mixed and stirred for 10 min to obtain a precursor solution of a metal-organic framework substance. The platinum mesh from the previous step was soaked in the precursor solution of the metal-organic framework substance for 1 h, and then moved to a drying oven for reaction at 90° C. for 1 h to form a compound of silica and the metal-organic framework substance in the macropores of the platinum mesh. The platinum mesh was moved to a tube furnace for heat treatment at 1200° C. in an inert atmosphere for 3 h. The platinum mesh was then taken out and soaked with 30 wt % hydrofluoric acid for 1 day to remove the silicon dioxide template, and then a large-area thick-film controllable textured photonic crystal was obtained. The textured photonic crystal was soaked with a toluene solution of sulfur with a concentration of 10 wt % for 10 min, the toluene solution was evaporated up with a heating stirrer, and then the textured photonic crystal was sealed with a glass bottle, and heat-treated at 140° C. for 8 h in an argon atmosphere. The textured photonic crystal was then soaked with a methanol solution for 30 s and then a sulfur cathode was obtained. The textured photonic crystal sulfur cathode serving as a working electrode and a lithium sheet serving as a counter electrode were then assembled into a lithium-sulfur battery.

In the description of the present specification, the description with reference to the terms "an embodiment", "example", "specific example", or the like means specific features, structures, materials or characteristics described in connection with the embodiment or example are included in at least one embodiment or example of the present invention. In the present specification, the schematic representations of the above terms do not necessarily refer to the same embodiment. Moreover, the specific features, structures, materials, or characteristics described may be combined in a suitable manner in any one or more embodiments or examples.

The foregoing description of the embodiments is provided for those of ordinary skill in the art to better understand and use the present invention. Obviously, those skilled in the art can easily make various modifications to these embodiments and apply the general principles described here to other embodiments without creative work. Therefore, the present invention is not limited to the above-mentioned embodiments and improvements and modifications made by those skilled in the art based on the principles of the present invention without departing from the scope of the present invention should fall within the scope of the present invention.

What is claimed is:

1. A preparation method for a lithium-sulfur battery based on a large-area thick-film controllable textured photonic crystal, comprising:
    preparation of monodisperse microsphere suspension liquid: adding a solvent to monodisperse microspheres and carrying out dispersion to obtain a suspension liquid;
    pretreatment of a substrate: ultrasonically cleaning the substrate in ethanol, acetone and isopropanol to remove impurities and organics from the surface, and then drying the substrate;
    preparation of microsphere photonic crystal: placing the substrate in the prepared suspension liquid, and then moving to an oven for self-assembly at a certain temperature until the solvent in the suspension liquid is completely volatilized, thus obtaining a microsphere photonic crystal;
    preparation of a carbon photonic crystal:
    soaking in a precursor solution of a metal-organic framework substance the substrate on which the microsphere photonic crystal is grown, and then moving the substrate to the oven for temperature-controlled reaction so that the metal-organic framework substance is generated in the gaps of the microsphere photonic crystal;
    moving the substrate to a tube furnace for high-temperature heat treatment in an inert atmosphere, and then naturally cooling the substrate to room temperature; and
    taking the substrate out and soaking the substrate in a hydrofluoric acid solution, and then taking the substrate out for cleaning and drying;
    preparation of a sulfur cathode:
    soaking the substrate in an organic solution of elemental sulfur so that the substrate fully absorbs the elemental sulfur and then taking the substrate out for drying; and
    sealing and treating the substrate at an appropriate temperature and then naturally cooling and dying the substrate to obtain the sulfur cathode; and
    preparation of a lithium-sulfur battery: assembling the sulfur cathode serving as a working electrode, a lithium sheet serving as a counter electrode, and a diaphragm made of polypropylene into the lithium-sulfur battery.

2. The preparation method for a lithium-sulfur battery based on a large-area thick-film controllable textured photonic crystal according to claim 1, wherein the monodisperse microspheres have a particle size of 100 nm to 1000 nm and the suspension liquid has a concentration of 0.1 wt % to 10 wt %.

3. The preparation method for a lithium-sulfur battery based on a large-area thick-film controllable textured photonic crystal according to claim 1, wherein the substrate is carbon fiber paper, carbon fiber cloth, wire mesh or nickel foam, and the wire mesh is a stainless steel mesh, a nickel mesh, a titanium mesh, a copper mesh, a tungsten mesh, a molybdenum mesh, a zirconium mesh, a lead mesh or a platinum mesh.

4. The preparation method for a lithium-sulfur battery based on a large-area thick-film controllable textured photonic crystal according to claim 1, wherein the self-assembly is carried out at a temperature of 35° C. to 65° C.

5. The preparation method for a lithium-sulfur battery based on a large-area thick-film controllable textured photonic crystal according to claim 1, wherein the microsphere photonic crystal has a thickness of 10 μm to 650 μm and an area of 0.1 $cm^2$ to 400 $cm^2$.

6. The preparation method for a lithium-sulfur battery based on a large-area thick-film controllable textured photonic crystal according to claim 1, wherein in the precursor solution of the metal-organic framework substance, a metal salt used is zinc nitrate, nickel nitrate, iron nitrate, cobalt nitrate or manganese nitrate, an organic ligand used is 2-methylimidazole, and a solvent used is one or more of methanol, N,N-dimethylformamide and N,N-dimethylacetamide, the metal salt has a solubility of 0.1 M to 10 M, and the organic ligand has a solubility of 0.1 M to 20 M.

7. The preparation method for a lithium-sulfur battery based on a large-area thick-film controllable textured photonic crystal according to claim 1, wherein the temperature-controlled reaction is carried out a temperature of 50° C. to 90° C. for 1 h to 12 h; the high-temperature heat treatment is carried out at a temperature of 600° C. to 1200° C. for 3 h to 12 h.

8. The preparation method for a lithium-sulfur battery based on a large-area thick-film controllable textured photonic crystal according to claim 1, wherein the hydrofluoric acid solution has a concentration of 0.5 wt % to 30 wt %.

9. The preparation method for a lithium-sulfur battery based on a large-area thick-film controllable textured photonic crystal according to claim 1, wherein in the organic solution of elemental sulfur, a solvent used is toluene or carbon disulfide, and the concentration of elemental sulfur is 1 wt % to 10 wt %.

10. The preparation method for a lithium-sulfur battery based on a large-area thick-film controllable textured photonic crystal according to claim 1, wherein the treatment at an appropriate temperature is carried out at a temperature of 120° C. to 160° C. for 1 h to 24 h.

\* \* \* \* \*